Oct. 25, 1938.  E. R. KOPPEL  2,134,563
UNIVERSAL JOINT
Filed Oct. 10, 1936
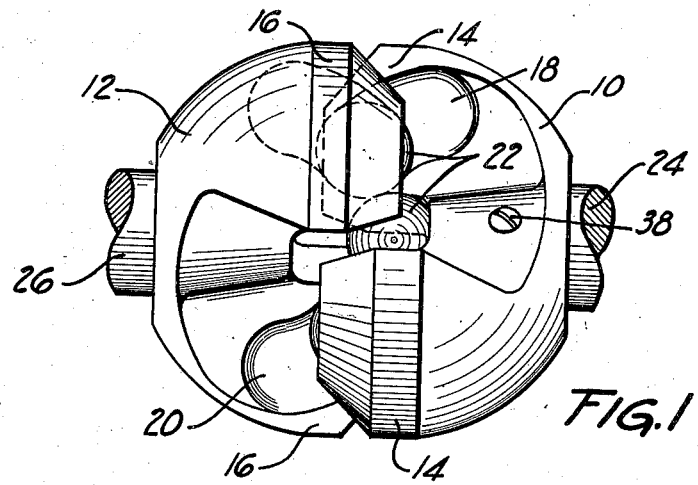
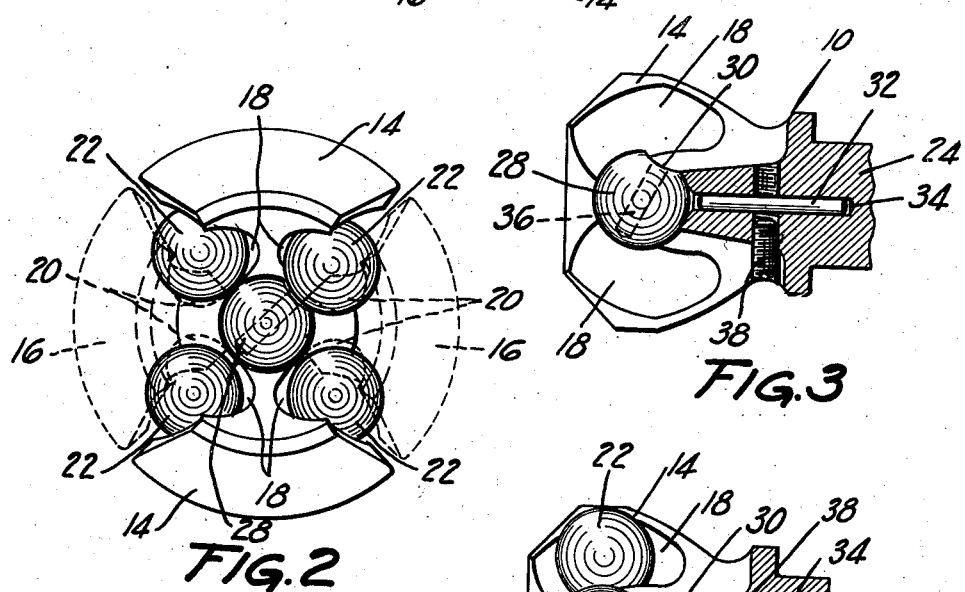
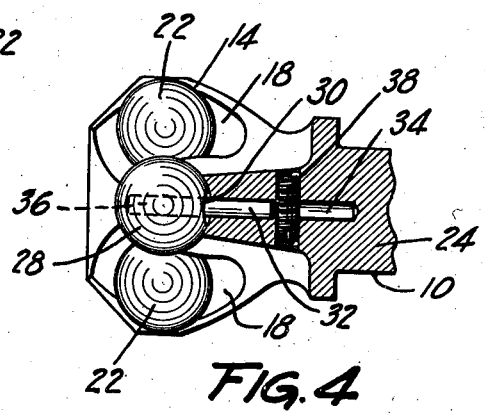
INVENTOR
ERNEST R. KOPPEL
BY
ATTORNEY Patented Oct. 25, 1938

2,134,563

UNITED STATES PATENT OFFICE 2,134,563

UNIVERSAL JOINT

Ernest R. Koppel, South Bend, Ind.

Application October 10, 1936, Serial No. 104,989

9 Claims. (Cl. 64—9)

This invention relates to universal joints, and more particularly to novel means to hold a universal joint in assembled position.

In certain types of universal joints, particularly of the constant angular velocity type, it has been necessary to employ an auxiliary shell partially surrounding the body sections of the joint to prevent the joint from becoming disassembled, or to retain the joint in assembled relation by the associated parts used in connection with the joint while in use. The auxiliary shell contacted with both body members of the joint under certain operating conditions thereby rendering it necessary to machine the generally spherical outer surfaces of the joint members to minimize friction. When the auxiliary shell was employed to hold the joint in assembled relation, it was, of course, impossible to disassemble the joint without removing or disassembling the auxiliary shell.

An object of this invention is therefore to provide novel means to hold the joint in assembled relation.

A further object is to provide a universal joint which may be manufactured more economically than similar joints have been manufactured heretofore.

A still further object of the invention is to provide novel means whereby a central ball, employed in constant angular velocity universal joints, may be manipulated to permit assembly of the joint, and then locked in a fixed position to prevent the joint from becoming disassembled.

Yet a further object of the invention resides in the provision of novel means to retain the joint in assembled relation while not in use, which permits of disassembly of the joint with a minimum of time and effort.

Other desirable features and advantages of this invention reside in rendering it unnecessary to machine the outer surfaces of the joint body members; the elimination of friction between the joint members and the auxiliary retaining shell; a reduction in the cost of assembling the joint, and permitting greater freedom of movement between the joint members.

Still other objects and advantages of this invention will be apparent from a consideration of the following detailed description, considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Figure 1 is a side elevation of a universal joint embodying the present invention, showing the body members drawn axially away from each other as far as the locking means will permit;

Figure 2 is an end elevation of one of the body members shown in Figure 1, the position of the other body member being indicated by dotted lines;

Figure 3 is a vertical section of one of the joint members, showing the locking means in the loading position; and Figure 4 is a view similar to Figure 3 showing the locking means in the locked position.

Referring more particularly to Figure 1 there is shown for purposes of illustrating this invention, a universal joint of the constant angular velocity type comprising body members 10 and 12, having cooperating arms 14 and 16 respectively. The proximate faces of arms 14 and 16 are provided with cooperating non-concentric grooves or raceways 18 and 20 respectively adapted to receive balls 22 therebetween to transmit torque from one of the joint members to the other and to roll in the raceways 18 and 20 to bisect the angle between the shafts 24 and 26 formed integral with or fixedly connected to the body members 10 and 12 of the joint, respectively.

It will be observed that in the illustrated embodiment the raceways 18 and 20 are curved and inclined radially inwardly, so that their axes intersect at an angle, in the manner disclosed in C. W. Weiss Patent 1,677,311, issued July 17, 1928. If, in this type of universal joint, the body members 10 and 12 are moved axially away from each other, the balls, which at all times occupy the point of intersection of the axes, move radially inward, and if such movement is continued they will reach a critical position where they may roll freely out of the inner ends of their raceways, thus disassembling the joint. In order to prevent this happening, even when the joint is being shipped or handled apart from the automobile or other organization of which it is to form a part, a central locking ball 28 having an arcuate recess 30 is introduced between the body members 10 and 12. The ball 28 is of such size that it is impossible to assemble or disassemble the joint unless the ball 28 is turned to such a position that the recess 30 will permit one of the balls 22 to pass the ball 28 as illustrated in Figures 2 and 3. When the joint has been assembled in this manner, the central ball 28 may then be turned to the locking position shown in Figure 4, whereupon it is impossible for the joint to become disassembled because, as the body members 10 and 12 are drawn axially away from each other, the balls 22 move radially inwardly and, as indicated in Figure 1, come into contact with the central ball 28 before they have reached the critical position wherein they are no longer retained by their raceways.

The central ball 28 is held in the locked position by means of a pin 32 slidable longitudinally in a bore 34 in the body member 10. The pin 32 projects into a bore 36 in the ball 28, and is held in a fixed position by means of a locking pin or screw 38 which intersects the bore 34 in the body member 10.

To assemble the joint, the pin 32 is placed in the bore 34 in the body member 10; the central ball 28 is then placed in proper position between the joint members 10 and 12. Three of the balls 22 are dropped in place between the cooperating raceways 18 and 20. The central ball 28 is then manipulated to such a position that the recess 30 will permit the last of the balls 22 to be inserted in the cooperating raceways 18 and 20. The central ball 28 is then turned to the position shown in Figure 4, and the pin 32 moved longitudinally into the bore 36 in the central ball 28, whereupon the locking means 38 is inserted to prevent the pin 32 from moving out of the central or locking ball 28. When the joint is installed in a vehicle or other device the body members will usually be closely nested together so that the central ball 28 will contact the inner face of the body member 12, in which case the balls will occupy the relative positions indicated in Figure 4.

It will be understood that this invention can be employed with joints having any desired number of cooperating arms, having torque transmitting means 22 positioned therebetween, carried by the body members of the joint, and with joints having either curved or straight cooperating raceways 18 and 20 formed in the body members. The driving means between the body members of the joint is shown herein as balls 22; however, any desired driving means such, for example, as rollers, may be employed if desired.

While the invention has been described with particular reference to one preferred embodiment, it is to be understood that the scope of the invention is not to be limited to the features illustrated and described, as many changes can be made without departing from the spirit of the invention as defined by the following claims.

I claim:

1. In a constant angular velocity universal joint, a pair of body members having spaced arms, balls positioned between the arms to transmit torque from one body member to the other, a central ball positioned between the body members and having a spherical recess therein adapted to cooperate with one of the torque transmitting balls to permit the joint to be assembled, and means to lock the central ball in a position to prevent the joint from becoming disassembled.

2. In a constant angular velocity universal joint, a pair of body members having spaced arms, balls positioned between the arms to transmit torque from one body member to the other, a central ball having a bore therein positioned between the body members and having a spherical recess therein adapted to cooperate with one of the torque transmitting balls to permit the joint to be assembled, means including a pin partially received in one of the body members adapted to extend into the bore in the central ball to lock the central ball in a position to prevent the joint from becoming disassembled, and means to hold the pin into the central ball.

3. In a constant angular velocity universal joint, a pair of body members having spaced arms, balls positioned between the arms to transmit torque from one body member to the other, a central ball having a bore therein positioned between the body members and having a spherical recess therein adapted to cooperate with one of the torque transmitting balls to permit the joint to be assembled, means including a pin partially received in one of the body members adapted to extend into the bore in the central ball to lock the central ball in a position to prevent the joint from becoming disassembled, and means including a retaining pin in the body member to hold the pin into the central ball.

4. A universal joint comprising a pair of body members having interengaging arms, torque transmitting balls interposed between the interengaging arms to transmit torque from one body member to the other, means including a locking ball having a bore therein adapted to be received between the body members and provided with a recess to permit one of the torque transmitting balls to pass by the locking ball to assemble the joint, and means associated with one of the body members and adapted to be partially received in the bore of the locking ball to hold the joint in the assembled relation.

5. In a universal joint, a pair of body members having coacting portions with their proximate faces formed with non-concentric grooves with their longitudinal axes intersecting at an angle, torque transmitting members received partly in said grooves, the grooves being so constructed and arranged that axial movement of the body members away from each other causes the torque transmitting members to move radially inwardly to a position where they are no longer retained by said grooves, and a locking member for preventing the torque transmitting members from reaching said position, said locking member having a recess operative in one position of the locking member to permit a torque transmitting member to be removed from said grooves, and means to normally prevent the recess from moving into said operative position.

6. In a universal joint, a pair of body members having coacting portions with their proximate faces formed with non-concentric grooves, torque transmitting balls received partly in said grooves, the grooves being so constructed and arranged that outward axial movement of the body members causes said balls to move radially inwardly to a position where they are no longer retained by said grooves, and a locking member for normally preventing the balls from reaching said position, said locking member having a surface movable by rotation of the locking member into a position where it permits a ball to be inserted in or removed from said grooves.

7. In a universal joint, a pair of body members having coacting portions with their proximate faces formed with grooves constituting circumferentially spaced raceways, torque transmitting balls in said raceways, the grooves being so constructed and arranged that outward axial movement of the body members causes the balls to move radially inwardly, and a non-spherical locking member normally limiting radial inward movement of the balls to thereby limit outward axial movement of the body members, but movable by rotation into a position where it permits movement of one of the balls inwardly beyond said predetermined position.

8. In a universal joint, a pair of body members having coacting portions with their proximate faces formed with grooves, at least one of said body members being provided with an integral shaft portion, torque transmitting balls received in said grooves, the grooves being so constructed and arranged that outward axial movement of the body members causes the balls to move radially inwardly, and a locking member normally preventing inward movement of the balls beyond a predetermined position, said locking member being movable by rotation into an inoperative position.

9. In a universal joint, a pair of body members having coacting surfaces formed with opposed grooves, torque transmitting balls received in said grooves, the grooves being so constructed and arranged that outward axial movement of the body members causes the balls to move radially inwardly, and a locking member limiting inward axial movement of the body members and normally operative to limit radial inward movement of the balls beyond a predetermined position, said locking member being movable by rotation to a position wherein it permits radial inward movement of the balls beyond said predetermined position.

ERNEST R. KOPPEL.